(12) United States Patent
Toni et al.

(10) Patent No.: US 7,867,928 B2
(45) Date of Patent: Jan. 11, 2011

(54) FLUID RESISTANT COMPOSITE SANDWICH PANEL

(75) Inventors: Darryl M. Toni, Madison, CT (US);
Bruce H. Barr, Southbury, CT (US);
Jeffrey G. Sauer, Woodbury, CT (US);
Jonathan Bremmer, Glastonbury, CT (US); Thomas Ranalli, Watertown, CT (US); Alan J. Norwid, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 618 days.

(21) Appl. No.: 11/956,479

(22) Filed: Dec. 14, 2007

(65) Prior Publication Data
US 2009/0156076 A1 Jun. 18, 2009

(51) Int. Cl.
*B32B 5/26* (2006.01)
(52) U.S. Cl. .................. 442/241; 442/242; 442/236; 442/238; 442/234
(58) Field of Classification Search ......... 442/241–242, 442/236, 238
See application file for complete search history.

(56) References Cited

U.S. PATENT DOCUMENTS

| 4,574,325 | A | 3/1986 | Holton |
| 4,593,870 | A | 6/1986 | Cronkhite et al. |
| 5,451,015 | A | 9/1995 | Cronkhite et al. |
| 5,674,586 | A | 10/1997 | Toni et al. |
| 6,138,949 | A | 10/2000 | Manende et al. |
| 6,427,945 | B1 | 8/2002 | Bansemir |
| 6,511,730 | B1 | 1/2003 | Blair et al. |
| 6,513,756 | B1 | 2/2003 | Lambiaso |
| 6,554,225 | B1 | 4/2003 | Anast et al. |
| 6,843,525 | B2 | 1/2005 | Preisler |
| 6,959,894 | B2 | 11/2005 | Hayashi |
| 7,100,885 | B2 | 9/2006 | Zerner |
| 7,124,982 | B2 | 10/2006 | Brofeldt |

OTHER PUBLICATIONS

International Search Report and Written Opinion mailed Aug. 18, 2009, PCT/US2008/084450.
X. Zhang, L. Hounslow, M. Grassi, "Improvement of Low-Velocity Impact and Compression-After-Impact Performance by Z-Fibre Pinning," Composites Science and Technology, 66 92006); 2785-2794.
A. Marasco, D. Cartie, I. Patridge, A. Rezai, "Mechanical Properties Balance in Novel Z-pinned Sandwich Panels: out-of-plane properties," Composites Part A—revision Mar. 2005.
A. Marasco, D. Cartie, I. Partridge, "Mechanical Properties Balance in Novel Z-pinned Sandwich Panels: Out-of-plane share," CompTest 2004, Bristol, Sep. 21-23, 2004.

*Primary Examiner*—Lynda Salvatore
(74) *Attorney, Agent, or Firm*—Carlson Gaskey & Olds PC

(57) ABSTRACT

A composite sandwich panel a first facing and a second facing over a core layer, the first and second facings having at least one fiberglass layer between an inner and an outer graphite layer.

20 Claims, 8 Drawing Sheets

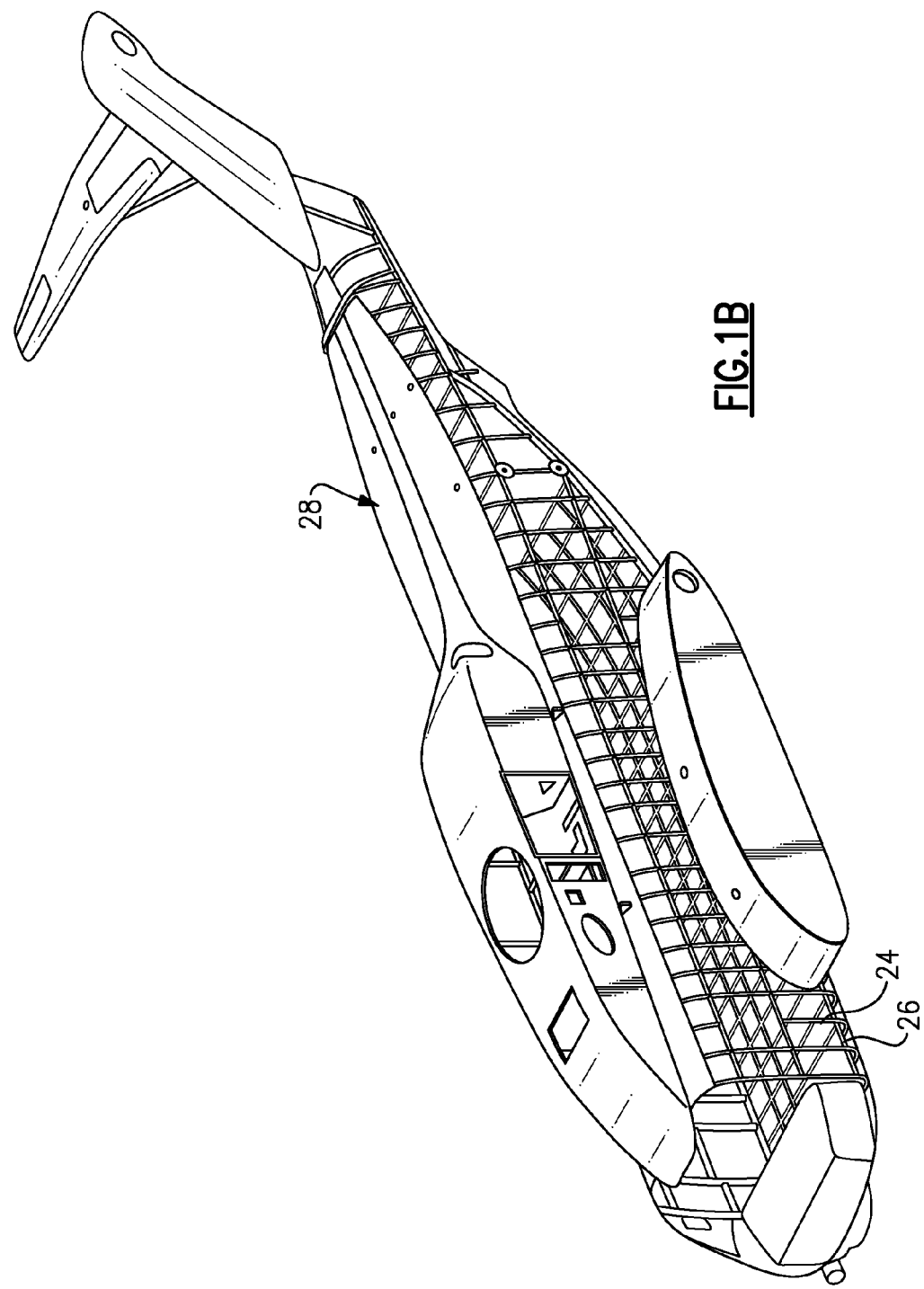

| LAYER | ORIENTATION | THICKNESS (in) |
|---|---|---|
| SURFACING FILM | – | 0.005 |
| WOVEN GRAPHITE | 45 | 0.008 |
| WOVEN FIBERGLAS | 45 | 0.009 |
| WOVEN FIBERGLAS | 0 | 0.009 |
| WOVEN GRAPHITE | 0 | 0.008 |
| 0.06 Wt FILM ADHESIVE | – | 0.005 |
| 4.5 pcf KEVLAR CORE | – | 0.5 |
| 0.06 Wt FILM ADHESIVE | – | 0.005 |
| WOVEN GRAPHITE | 0 | 0.008 |
| WOVEN FIBERGLAS | 0 | 0.009 |
| WOVEN FIBERGLAS | 45 | 0.009 |
| WOVEN GRAPHITE | 45 | 0.008 |
| SURFACING FILM | – | 0.005 |

FIG.2D

JSSG-2006
FIGURES & TABLES

LOW ENERGY IMPACT (TOOL IMPACT)

| ZONE | DAMAGE SOURCE | DAMAGE LEVEL | REQUIREMENTS IN ADDITION TO PARAGRAPH 3.11.1 |
|---|---|---|---|
| 1<br>HIGH PROBABILITY OF IMPACT | -0.5 IN. DIA. SOLID IMPACTOR<br>-LOW VELOCITY<br>-NORMAL TO SURFACE | IMPACT ENERGY SMALLER OF 6 FT-LBS OR VISIBLE DAMAGE (0.1 IN. DEEP) WITH MIN. OF 4 FT-LBS. | * NO FUNCTIONAL IMPAIRMENT OR STRUCTURAL REPAIR REQUIRED FOR TWO DEWSIGN LIFETIMES AND NO WATER INTRUSION<br>* NO VISIBLE DAMAGE FROM A SINGLE 4 FT-LB IMPACT |
| 2<br>LOW PROBABILITY OF IMPACT | SAME AS ZONE 1 | IMPACT ENERGY SMALLER OF 6 FT-LBS OR VISIBLE DAMAGE (0.1 IN. DEEP) | * NO FUNCTIONAL IMPAIRMENT AFTER TWO DESIGN LIFETIMES AND NO WATER INTRUSION AFTER FIELD REPAIR IF DAMAGE IS VISIBLE |

FIG.3

FLUID RESISTANT COMPOSITE SANDWICH PANEL

This invention was made with government support under Contract No.: N00019-06-C-0081. The government therefore has certain rights in this invention.

BACKGROUND OF THE INVENTION

The present invention relates to lightweight composite sandwich panels.

Conventional composite sandwich panels may typically utilize a honeycomb core material with pre-cured fiberglass or prepreg composite skins bonded thereto in a large heated press or autoclave. Local hard points and edge closeouts are typically accomplished using an epoxy potting compound.

Although relatively lightweight and of significant strength characteristics, current composite sandwich panels may suffer moisture absorption. Moisture absorption may result in increased weight and performance degradation over a prolonged time period. Such degradation may be further hastened by impact and wear, and such degradation typically prevents usage of conventional composite sandwich panels in maintenance and high wear areas of the aircraft.

SUMMARY OF THE INVENTION

A composite sandwich panel according to an exemplary aspect of the present invention includes a first facing surfacing film layer; a first facing outer graphite layer adjacent to the first facing surfacing film layer; at least one first facing fiberglass layer adjacent to the first facing outer graphite layer; a first facing inner graphite layer adjacent to the at least one first facing fiberglass layer; a core layer adjacent to the first facing inner graphite layer; a second facing inner graphite layer adjacent to the core layer; at least one second facing fiberglass layer adjacent to the second facing inner graphite layer; a second facing outer graphite layer adjacent to the at least one second facing fiberglass layer; and a second facing surfacing film layer adjacent the second facing outer graphite layer.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1B is a perspective view of the rotary wing aircraft of FIG. 1A illustrating an upper surface which utilizes the composite sandwich panel according to one aspect of the present invention;

FIG. 2D is a chart delineating each layer of the panel;

FIG. 3 is a table describing Joint Service Specification Guide (JSSG) criteria;

DETAILED DESCRIPTION OF EXEMPLARY EMBODIMENTS

Figure 1A:
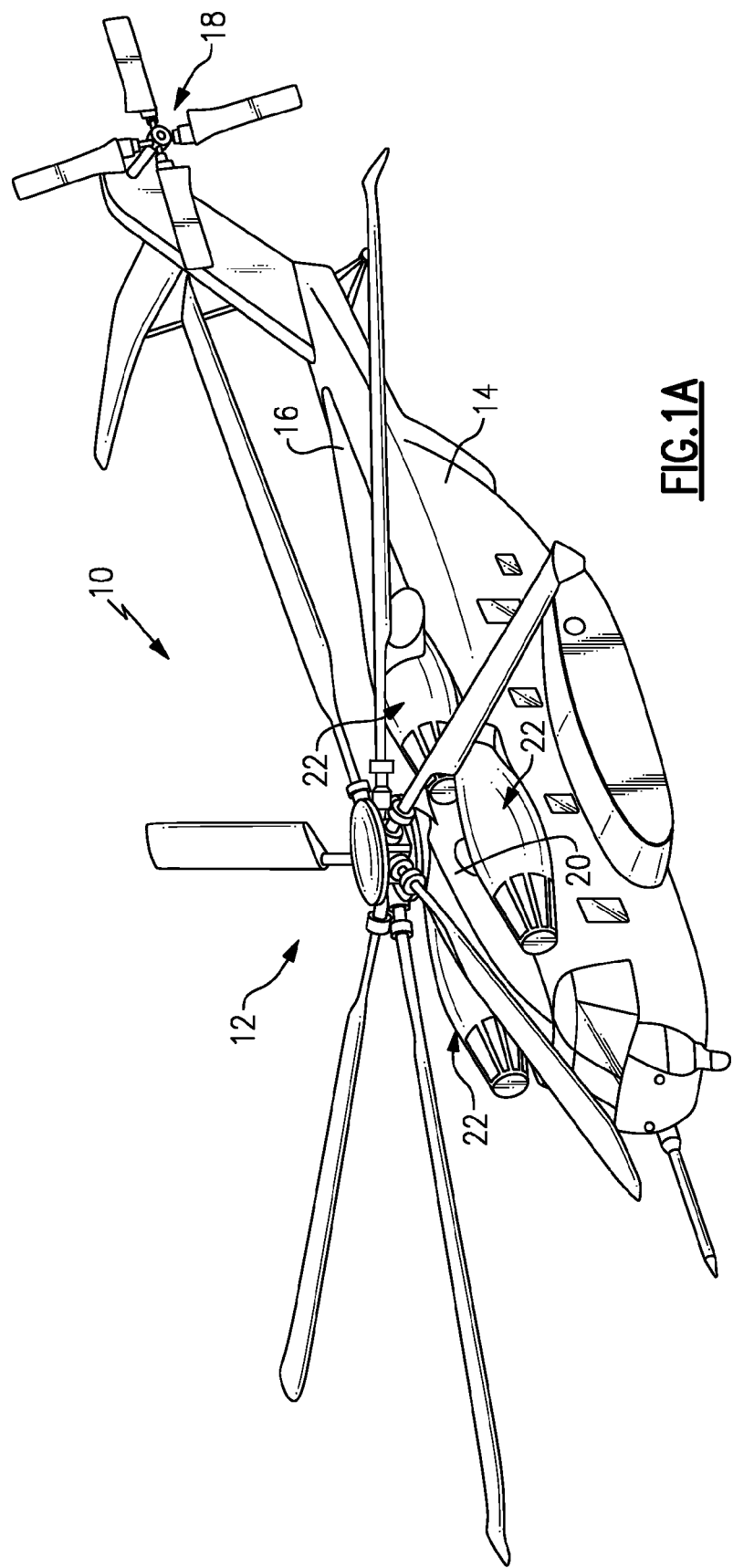
FIG. 1A is a general side perspective view of an exemplary rotary wing aircraft embodiment for use with an aspect of the present invention.

FIG. 1A schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation R through a main gearbox (illustrated schematically at 20) by one or more engines 22. The main rotor system 12 includes a multiple of rotor blades mounted to a rotor hub. Although a particular helicopter configuration is illustrated and described in the disclosed embodiments, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 1C:
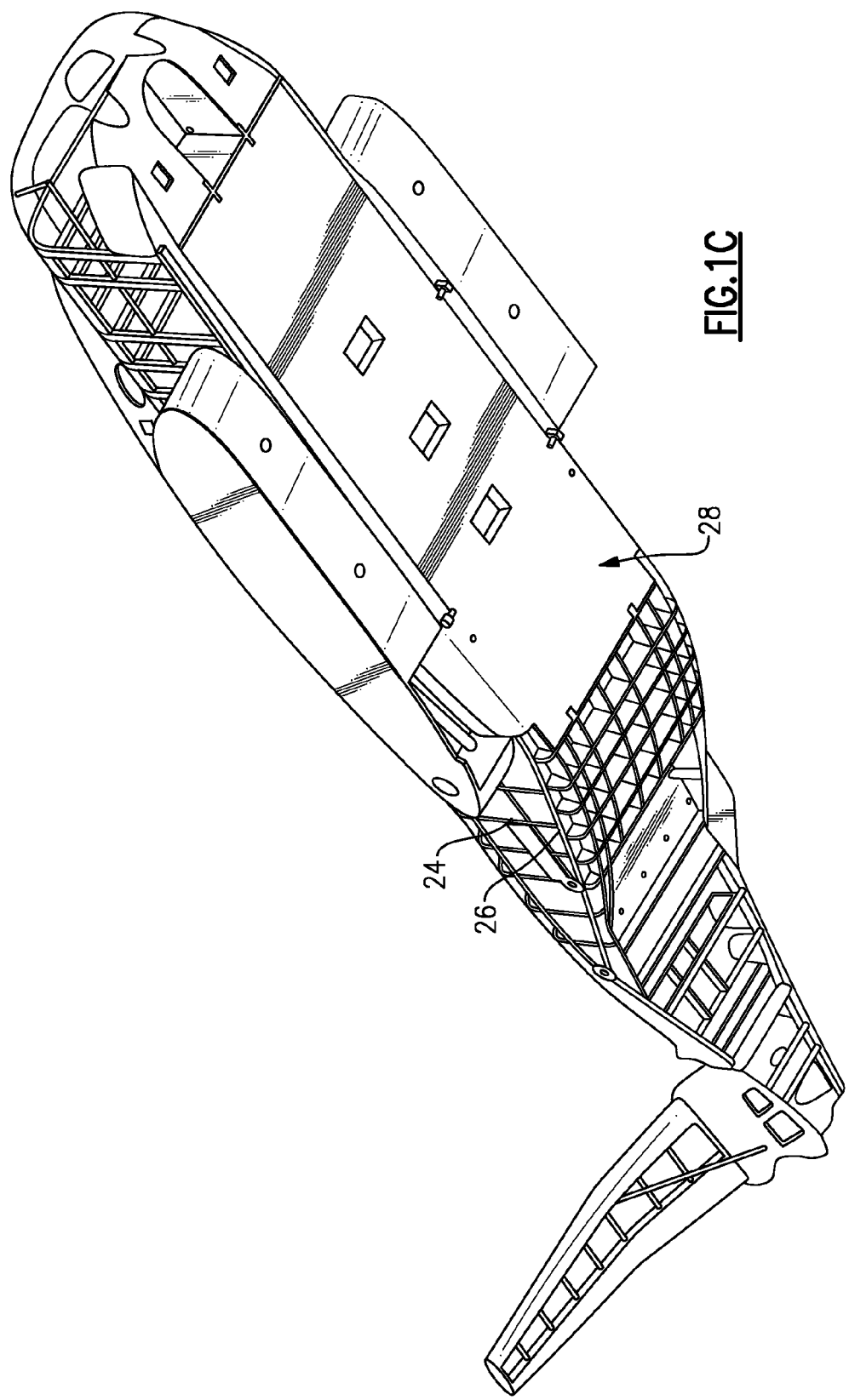
FIG. 1C is a perspective view of the rotary wing aircraft of FIG. 1A illustrating a lower surface which utilizes the composite sandwich panel according to one aspect of the present invention.
Figure 2A:
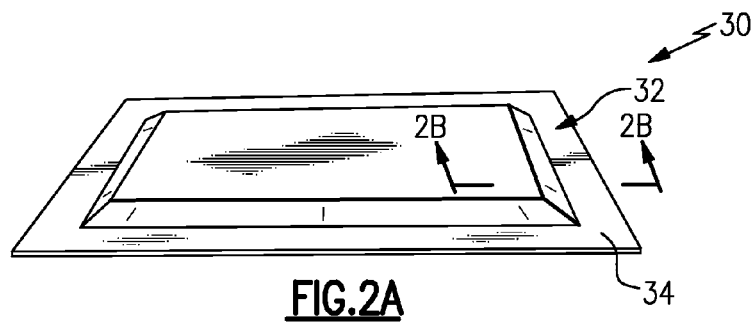
FIG. 2A is a perspective view of a composite sandwich panel illustrating an exemplary ramp configuration thereof.

Referring to FIGS. 1B and 1C, the airframe 14, which may include, inter alia, a multitude of frame members 24 and a multitude of beam members 26 which support an aircraft outer skin 28 formed of a multiple of composite sandwich panels 30 (see, e.g., FIG. 2A). The multitude of frame members 24 and beam members 26 may be arranged in a generally rectilinear pattern, however, any arrangement may be used with the present invention as the composite sandwich panels 30 provide the rigidity necessary to reduce or eliminate the necessity of stringers.

Figure 4:
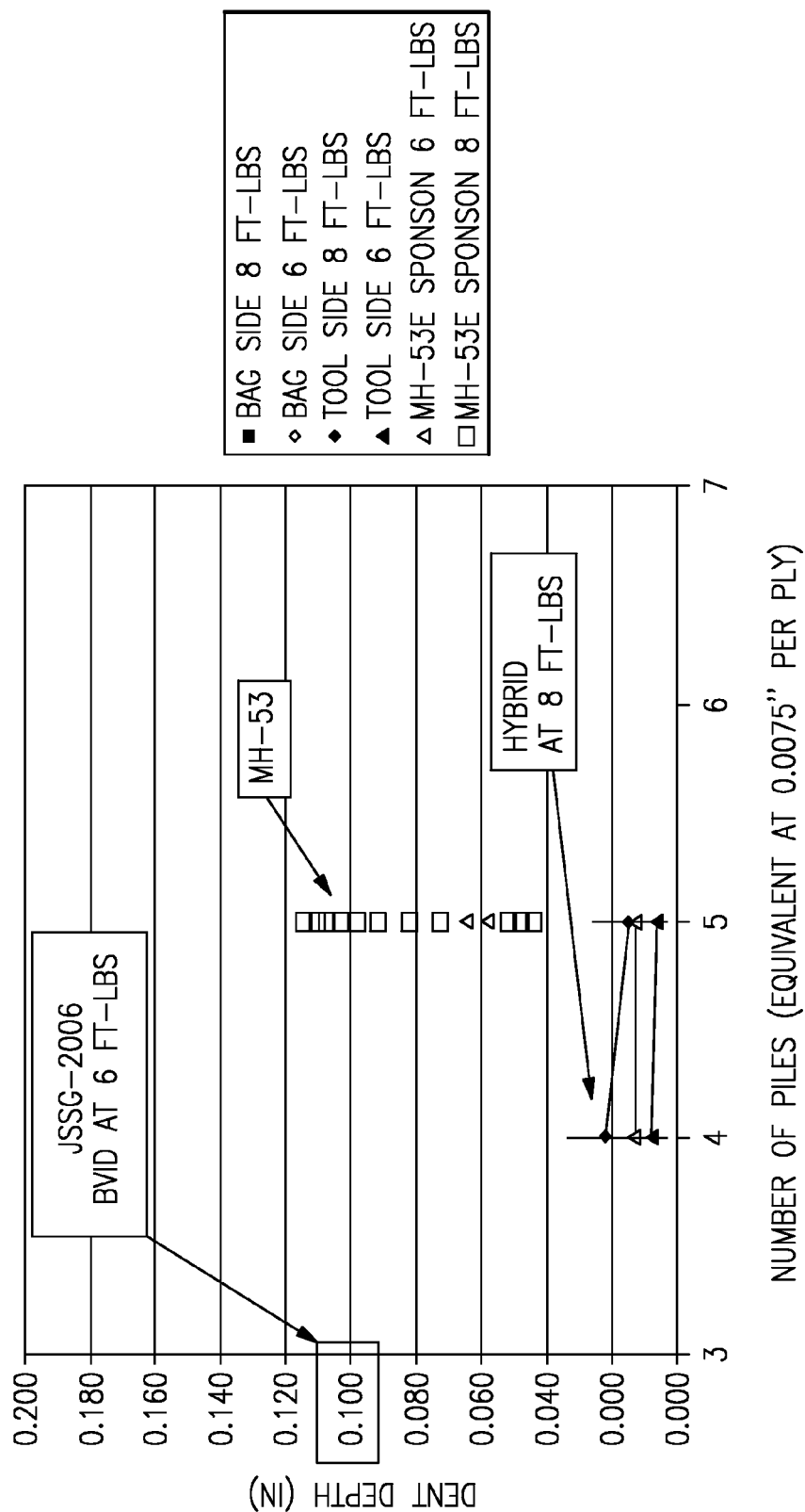
FIG. 4 is a graph comparing the panel according to one aspect of the present invention with other conventional constructions.

The composite sandwich panels 30 are impermeable to water penetration with an 8 ft-lb impact resistance which meets (and exceeds, at least in terms of impact energy) Joint Service Specification Guide (JSSG)-2006 durability criteria (FIG. 3) at a lighter construction than industry standard techniques: one-fifth the dent depth was realized with a lighter construction (four plies instead of the typical five plies) even at higher impact energies (FIG. 4). Such composite sandwich panels 30 may thereby be utilized in maintenance walkway areas such as aircraft upper surfaces (FIG. 1B), high impact areas such as aircraft undersurfaces (FIG. 1C) as well as other areas such as wheel wells, floors, and steps. It is noted that such areas are generally not applicable to non skin/stringer panel construction, which means that exemplary embodiments herein have broader applicability.

Figure 2B:
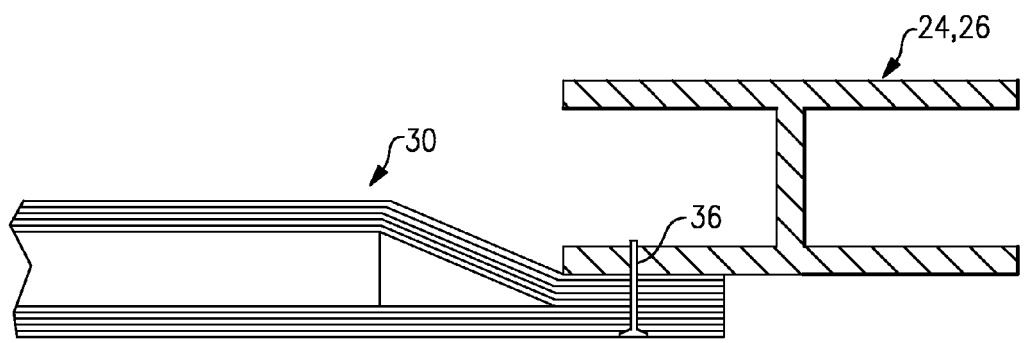
FIG. 2B is a sectional view of the panel of FIG. 2A taken along lines 2B-2B, the panel illustrated adjacent to a schematic frame or bulk head.

Referring to FIG. 2A, the composite sandwich panels 30 may be manufactured with a ramp edge structure 32 which defines a flange edge 34 that is, for example, mechanically attached to the airframe frame members 24 and beam members 26 as conventionally understood. The composite sandwich panels 30 are attached to the frame members 24 and the beam members 26 through fasteners 36 which are located through the flange edge 34 of each composite sandwich panels 30 (FIG. 2B).

Figure 2C:
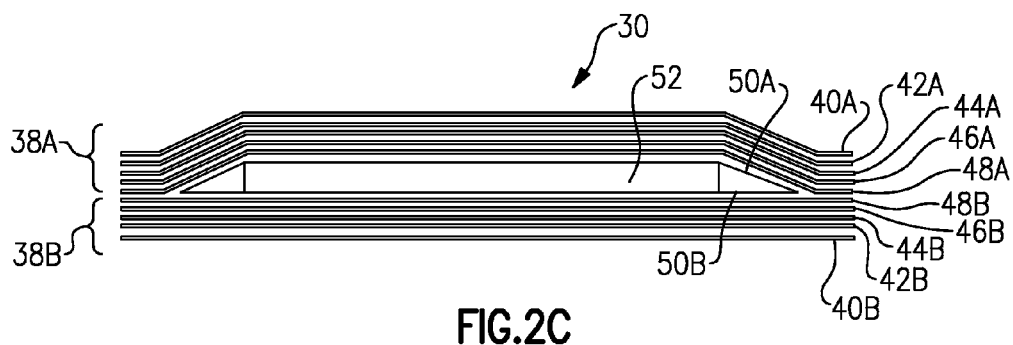
FIG. 2C is an exploded view of the panel of FIG. 2A illustrating each layer thereof.

Referring to FIG. 2C, each composite sandwich panel 30 is manufactured as a sandwich structure having a multiple of layers bonded together. The composite sandwich panel 30 may be manufactured in a single step process using prepreg autoclave processing or resin infusion techniques, such as, for example only, resin film infusion (RFI), or combinations of these techniques. It should be understood that other fabrication methods will also benefit from the present invention.

The composite sandwich panel 30 generally includes a ramp side 4-ply laminate 38A and a flat side 4-ply laminate 38B over a core 52. More specifically, the composite sandwich panel 30 includes a surfacing film layer 40A, a ramp side outer graphite layer 42A, two ramp side fiberglass layers 44A, 46A, a ramp side inner graphite layer 48A, a ramp side film adhesive layer 50A, a core 52, a flat side film adhesive layer 50B, a flat side inner graphite layer 48B, two flat side fiberglass layers 44B, 46B, a flat side outer graphite layer 42B and a flat side surfacing film layer 40B. It should be understood that various methods may be utilized to bond each layer to the adjacent layer and that various thicknesses (number of plies) within each layer may be utilized with the present invention. It should be further understood that additional or alternative layers may be included such as, for example only, an armored layer.

Figure 5:
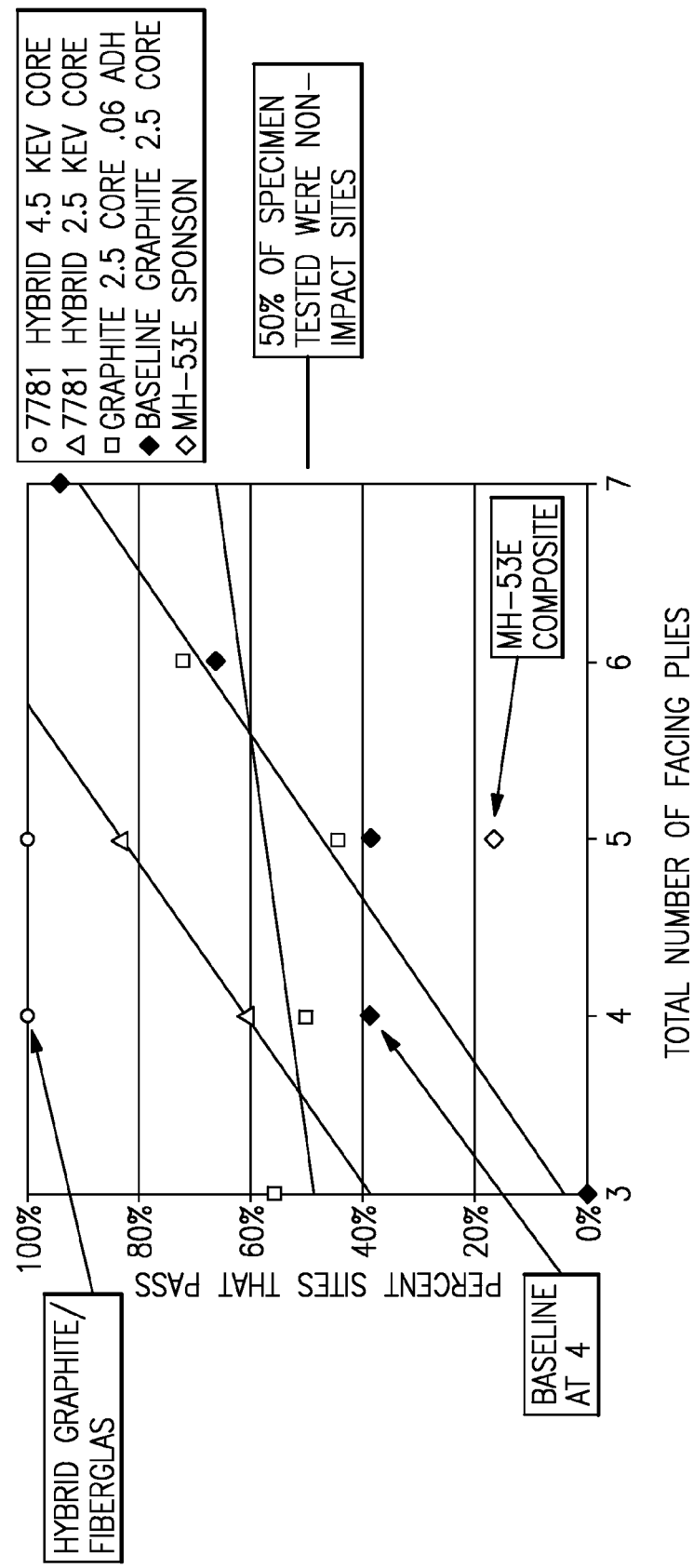
FIG. 5 is a graph illustrating an exemplary composite panel meeting 100 percent of a permeability test after a six pound impact at a single site and at non-impact site.

In one non-limiting embodiment, the composite sandwich panel 30 provides an eight foot-pound (8 ft-lb), no fluid intrusion 0.10 inch maximum dent depth panel (FIG. 5). The surfacing film layers 40A, 40B may be SS8620-03. The surfacing film 40A, 40B is in an exemplary embodiment an adhesive (generally a modified epoxy resin) which may contain filler materials (e.g., micro-balloons, or other organic/inorganic fillers) which is supplied on a nonwoven or mat type carrier. Since the film adhesive layer 50A, 50B is non-supported, during cure the adhesive and fillers melt and flow into low pressure areas of the laminate (on plain weave fabric it would be the area between the fiber cross-overs) and fill these areas (pinholes, etc.) making a smooth cured surface. Examples of such surfacing films include but are not limited to AF325 manufactured by 3M of Minnesota, USA and FM300, FM99 manufactured by Cytech Industries Inc. of New Jersey, USA. In an exemplary embodiment, the outer graphite layers 42A, 42B may be 45 degree prepreg woven graphite, the fiberglass layers 44A, 44B may be 45 degree prepreg woven fiberglass, the fiberglass layers 46A, 46B may be 0 (zero) degree prepreg woven fiberglass, the inner graphite layers 48A, 48B may be 0 (zero) degree prepreg woven graphite, the film adhesive layers 50A, 50B may be 0.06 weight (wt) film adhesive and the core 52 may be a 4.5 pounds per cubic foot (pcf) Kevlar core (FIG. 2D).

The surfacing film layers 40A, 40B assure initial facing seal integrity from moisture. This confers an advantage in situations where water absorption and freeze-thaw cycles may otherwise be problematic.

The four (4) ply graphite/fiberglass facing laminate 42A, 42B, 44A, 44B, 46A, 46B 48A, 48B adjacent to the light-weight (in an exemplary embodiment) core 52 provides strength to minimize impact damage. The core 52 may be a Kevlar honeycomb core such as that manufacture by DuPont Advanced Fibers Systems of Richmond, Va., USA but alternatively or additionally include an advanced core material such as K-COR™ or X-COR™ manufactured by Albany Engineered Composites of Mansfield, Mass., USA. It should be further understood that the core may be manufactured in a multiple of forms, shapes and thicknesses.

The thick two (2) ply fiberglass region 44A, 44B, 46A, 46B toward the interior of each facing laminate facilitates the impermeable layer used to survive the impact level and retain moisture resistance. It should be understood that low modulus and high strain to failure capability material layers other than fiberglass type materials such as layers manufactured from, either singularly or in combination, carbon, S-glass, E-glass, Dyneema®, Spectra®, Kevla®, etc. may alternatively or additionally be utilized.

Relatively large resin fillets resultant from the film adhesive layers 50A, 50B (0.06 wt film adhesive) utilized with the core 52 facilitates resistance to core buckling during impact.

Applicant has determined that the composite sandwich panel 30 disclosed in this non-limiting embodiment will meet the "100% no fluid intrusion" criteria at 6 ft-lbs impact energy (FIG. 5). It should be noted in FIG. 5 that "KEV" means "kevlar".

It should be appreciated that the composite sandwich panel may also be utilized for floor panels and other panels such as in fixed wing aircraft, ground transportation vehicles, etc and that various panel sizes, layer combinations and depth of layers may be utilized and specifically tailored to provide the desired panel.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention. Although particular step sequences are shown, described, and claimed, it should be understood that steps may be performed in any order, separated or combined unless otherwise indicated and will still benefit from the present invention.

The foregoing description is exemplary rather than defined by the embodiments within. Many modifications and variations of the present invention are possible in light of the above teachings. Particular exemplary embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite sandwich panel comprising:
   a first facing comprising:
      a first surfacing film layer;
      a first outer graphite layer adjacent to said first surfacing film layer;
      at least one first fiberglass layer adjacent to said first outer graphite layer;
      a first inner graphite layer adjacent to said at least one first fiberglass layer;
   a core layer adjacent to said first inner graphite layer;
   a second facing inner graphite layer adjacent to said core layer;
   at least one second facing fiberglass layer adjacent to said second facing inner graphite layer;
   a second facing outer graphite layer adjacent to said at least one second facing fiberglass layer; and
   a second facing surfacing film layer adjacent to said second facing outer graphite layer.

2. The panel as recited in claim 1, wherein said first facing forms a four-ply laminate and said second facing forms a four-ply laminate.

3. The panel as recited in claim 2, wherein said at least one first fiberglass layer comprises two fiberglass layers.

4. The panel as recited in claim 3, wherein said two fiberglass layers comprise a first facing outer 45 degree woven fiberglass layer adjacent to said first facing outer graphite layer and a first facing inner zero degree woven fiberglass layer adjacent to said first facing outer 45 degree woven fiberglass layer and said first facing inner graphite layer.

5. The panel as recited in claim 4, wherein said first facing outer graphite layer comprises a 45 degree woven graphite layer.

6. The panel as recited in claim 5, wherein said first facing inner graphite layer comprises a zero degree woven graphite layer.

7. The panel as recited in claim 1, wherein said first facing outer graphite layer comprises a 45 degree woven graphite layer.

8. The panel as recited in claim 1, wherein said first facing inner graphite layer comprises a 0 degree woven graphite layer.

9. The panel as recited in claim 2, wherein said at least one second facing fiberglass layer comprises two fiberglass layers.

10. The panel as recited in claim 9, wherein said two fiberglass layers comprise a second facing outer 45 degree woven fiberglass layer adjacent to said second facing outer graphite layer and a second facing inner 0 degree woven fiberglass layer adjacent to said second facing outer 45 degree woven fiberglass layer and said second facing inner graphite layer.

11. The panel as recited in claim 10, wherein said second facing outer graphite layer comprises a 45 degree woven graphite layer.

12. The panel as recited in claim 11, wherein said second facing inner graphite layer comprises a 0 degree woven graphite layer.

13. The panel as recited in claim 1, wherein said second facing outer graphite layer comprises a 45 degree woven graphite layer.

14. The panel as recited in claim 1, wherein said second facing inner graphite layer comprises a 0 degree woven graphite layer.

15. The panel as recited in claim 1, wherein each of said first facing outer graphite layer, said first facing inner graphite layer, said second facing outer graphite layer, and said second facing inner graphite layer comprises a woven graphite layer.

16. The panel as recited in claim 1, wherein each of said first facing outer graphite layer, said first facing inner graphite layer, said second facing outer graphite layer, and said second facing inner graphite layer comprises a prepreg woven graphite layer.

17. The panel as recited in claim 1, wherein said core layer defines a ramp edge structure.

18. The panel as recited in claim 1, wherein said core layer comprises a 4.5 pcf Kevlar core.

19. The panel as recited in claim 1, further comprising a first facing film adhesive between said core layer and said first facing inner graphite layer and a second facing film adhesive between said core layer and said second facing inner graphite layer.

20. The panel as recited in claim 19, wherein said first facing film adhesive and said second facing film adhesive comprises a 0.06 wt adhesive layer.

* * * * *